United States Patent
Wang et al.

(10) Patent No.: US 10,430,208 B2
(45) Date of Patent: Oct. 1, 2019

(54) MULTI-VERSION ASYNCHRONOUS DYNAMIC SOFTWARE UPDATE SYSTEM AND METHOD FOR APPLICATIONS WITH MULTIPLE THREADS

(71) Applicants: Kai-Ting Amy Wang, Toronto (CA); Peng Wu, Pittsford, NY (US); Brice Dobry, Kingsville, MD (US); Haichuan Wang, San Jose, CA (US)

(72) Inventors: Kai-Ting Amy Wang, Toronto (CA); Peng Wu, Pittsford, NY (US); Brice Dobry, Kingsville, MD (US); Haichuan Wang, San Jose, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 15/584,785

(22) Filed: May 2, 2017

(65) Prior Publication Data
US 2018/0321956 A1     Nov. 8, 2018

(51) Int. Cl.
G06F 9/445     (2018.01)
G06F 8/656     (2018.01)
G06F 9/448     (2018.01)
G06F 9/38      (2018.01)
G06F 8/41      (2018.01)
G06F 8/71      (2018.01)
G06F 9/22      (2006.01)

(52) U.S. Cl.
CPC .......... G06F 9/44536 (2013.01); G06F 8/656 (2018.02); G06F 9/3893 (2013.01); G06F 9/449 (2018.02); G06F 9/44521 (2013.01); G06F 9/44526 (2013.01); G06F 8/434 (2013.01); G06F 8/71 (2013.01); G06F 9/223 (2013.01); G06F 9/44552 (2013.01)

(58) Field of Classification Search
CPC ................................................... G06F 9/44536
USPC ........................................................ 717/170
See application file for complete search history.

(56) References Cited

U.S. PATENT DOCUMENTS 5,442,758 A   8/1995   Slingwine et al.
6,338,103 B1  1/2002   Kirihata
(Continued)

OTHER PUBLICATIONS

"Safe Software Updates via Multi-version Execution"—Petr Hosek & Cristian Cadar; Department of Computing; Imperial College, London—ICSE 2013, San Francisco, CA, USA.*
"Multi-version Execution for the Dynamic Updating of Cloud Applications"; Feng Chen, Weizhong Qiang, Hai Jin, Deqing Zou, Duoqiang Wang—Services Computing Technology and System Lab Cluster and Grid Computing Lab Huazhong University—2015 IEEE 39th Annual International Computers, Software & Applications Conference.*
(Continued)

Primary Examiner — Francisco J Aponte (57) ABSTRACT

A method and system for using multiple versions of a software component, includes storing, in memory, a first function table that points to executable code in the memory for functions from a first version of the software component, and storing, in the memory, a second function table that points to executable code in the memory for functions from a second version of the software component, referencing the first function table, when running a first application thread, to execute the functions from the first version of the software component; and referencing the second function table, when running a second application thread that is active concurrently with the first application thread, to execute the functions from the second version of the software component.

15 Claims, 6 Drawing Sheets

(56) References Cited

U.S. PATENT DOCUMENTS

| | | | | |
|---|---|---|---|---|
| 6,721,874 | B1* | 4/2004 | Le | G06F 9/30094 712/218 |
| 7,287,131 | B1* | 10/2007 | Martin | G06F 16/9014 711/154 |
| 8,185,886 | B2* | 5/2012 | Rothman | G06F 8/65 717/171 |
| 8,762,949 | B2* | 6/2014 | Conway | G06F 8/73 717/126 |
| 10,042,620 | B1* | 8/2018 | Miyake | G06F 8/71 |
| 2006/0053116 | A1* | 3/2006 | Rits | G06F 8/316 |
| 2006/0200817 | A1* | 9/2006 | Callender | G06F 9/4411 717/170 |
| 2011/0010696 | A1 | 1/2011 | Lobo et al. | |
| 2014/0157108 | A1* | 6/2014 | Schmidt | G06F 17/2247 715/234 |
| 2014/0375657 | A1 | 12/2014 | Fortini et al. | |
| 2015/0248285 | A1* | 9/2015 | Kang | G06F 8/656 717/170 |
| 2016/0274899 | A1* | 9/2016 | Mencias | G06F 9/44557 |

OTHER PUBLICATIONS

"MUC: Updating cloud applications dynamically via multi-version execution"; Weizhong Qiang, Feng Chen, Laurence T. Yang, Hai Jin—Future Generation Computer Systems 74 (2017) 254-264.*

"A Study of Dynamic Software Update Quiescence for Multithreaded Programs"; Christopher M. Hayden, Karla Saur, Michael Hicks, Jeffrey S. Foster, University of Maryland, College Park—IEEE HotSWUp 2012, Zurich, Switzerland.*

"Immediate Multi-Threaded Dynamic Software Updates Using Stack Reconstruction"; Kristis Makris Rida A. Bazzi; Arizona State University Tempe, AZ—USENIX annual technical conference, 2009.*

Arnold et al., "Ksplice: Automatic Rebootless Kernel Updates", https://pdos.csail.mit.edu/papers/ksplice:eurosys.pdf, Feb. 11, 2010.

Hayden et al., Kitsune: Efficient, General-purpose Dynamic Software Updating for C, https://www.cs.umd.edu/~tedks/papers/2012-oopsla-kitsune.pdf, Oct. 19, 2012.

https://github.com/MariaDB/server/blob/10.1/sql/handler.h#L1016, May 2, 2017.

\* cited by examiner

MULTI-VERSION ASYNCHRONOUS DYNAMIC SOFTWARE UPDATE SYSTEM AND METHOD FOR APPLICATIONS WITH MULTIPLE THREADS

TECHNICAL FIELD

The present invention relates to multi-version asynchronous dynamic software updates for applications with multiple threads.

BACKGROUND

Computer programs and applications commonly make use of a plugin style architecture in which a base computer program relies on other software components, known alternatively as plugins, add-ins, add-ons or extensions, that can add specific features to the base computer program. Examples of plug-ins are the storage engine Application Program Interfaces (APIs) underneath Relational Database Services (RDS) such as MySQL. Such APIs are typically exposed as function pointer tables in shared libraries. Another example of a plugin architecture is the controller code that runs on a base station unit (BU) in a Cloud-Radio Access Network (Cloud-RAN).

In the plugin environment, several co-existing program threads can be accessing the same plugin components, which can introduce challenges when updating plugin components. Dynamic Software Update (DSU) procedures have been developed to allow code and data updates such as critical security patches to be applied to a software component such as a plugin without downtime. For example, Ksplice (Ksplice: Automatic Rebootless Kernel Updates; Jeff Arnold and M. Frans Kaashoek; Massachusetts Institute of Technology; https://pdos.csail.mit.edu/papers/ksplice:eurosys.pdf) describes a DSU procedure for applying patches into the Linux kernel. Another example is the Kitsune system (Kitsune: Efficient, General-purpose Dynamic Software Updating for C; Christopher M. Hayden, Edward K. Smith, Michail Denchev, Michael Hicks, Jeffrey S. Foster; University of Maryland, College Park, USA; https://www-.cs.umd.edu/~tedks/papers/2012-oopsla-kitsune.pdf). Both of these procedures require quiescing the system in some way before the update can be performed. In the present disclosure, DSU procedures that require the system to be quiesced before a dynamic update can be applied are referred to as "synchronous" DSU procedures. Synchronous DSU ensures that an update in the system state will be observed by all threads consistently. However, Synchronous DSU can be disadvantageous in some systems because the overhead of quiescing the system can increase as the number of active threads increases.

Accordingly, there is a need for a DSU procedure and system in which software updates can be applied to a software component that does not require quiescing the system.

SUMMARY

The present disclosure presents a dynamic software update (DSU) method and system for multi-threaded applications. The DSU system that is described is asynchronous in that the update can be done on a thread by thread basis with each thread independently updating to a new software component version at an opportune time for that particular thread. Accordingly, the application environment does not have to be quiesced before a dynamic update can be applied.

According to a first example aspect is a method for using a software component. The method includes storing, in memory, a first function table that points to executable code in the memory for functions from a first version of the software component, and storing, in the memory, a second function table that points to executable code in the memory for functions from a second version of the software component. The method also includes referencing the first function table, when running a first application thread, to execute the functions from the first version of the software component; and referencing the second function table, when running a second application thread that is active concurrently with the first application thread, to execute the functions from the second version of the software component.

In some embodiments of the first aspect, the first function table and the second function table are stored as objects in a linked list. In some embodiments the method includes setting a global pointer to point to the first function table, copying the global pointer to a local pointer of the first application thread, wherein the first application thread uses its local pointer to reference the first function table, setting the global pointer to point to the second function table, and copying the global pointer to a local pointer of the second application thread, wherein the second application thread uses its local pointer to reference the second function table.

In some examples, the method includes copying the global pointer to the local pointer of the first application thread to update the first application thread to the functions from the second version of the software component. In some configurations, the method includes de-allocating memory for the first version of the software component when no application threads have a local pointer that references the first function table. In some examples, the method includes monitoring for a signal indicating that the second version of the software component is available, wherein the second function table is stored in the memory and the global pointer is set to point to the second function table after detecting the signal.

In some embodiments of the first aspect, a pointer is included in the second function table that points to the first function table. In some embodiments the application is a Go program and the running threads are goroutines.

According to a second aspect is a processing system configured to support a live software component update. The system includes a processing device, a memory associated with the processing device, and a non-transient storage for storing instructions. When loaded to the memory and executed by the processing device, the instructions cause the processing system to: store, in the memory, a first function table that points to executable code in the memory for functions from a first version of a software component; store, in the memory, a second function table that points to executable code in the memory for functions from a second version of the software component; reference the first function table, when running a first thread of an application, to execute the functions from the first version of the software component; and reference the second function table, when running a second thread of the application that is active concurrently with the first thread, to execute the functions from the second version of the software component.

In some examples of the second aspect, the instructions cause the processing system to reference the first function table, when running the first thread of an application, by: setting a global pointer to point to the first function table when the first function table is stored; and setting, when the first thread is created, a local pointer of the first thread equal to the global pointer; and cause the processing system to reference the second function table, when running the second thread of the application, by: setting the global pointer to point to the second function table when the second function table is stored; and subsequently setting, when the second thread is created, a local pointer of the second thread equal to the global pointer. In some examples, the instructions cause the processing system to, for each of the threads of the application, asynchronously set the local pointer of the thread to a current value of the global pointer if the local pointer is not equal to the current value of the global pointer. In some examples, the processing system maintains a counter for each of the stored function tables that identifies a number of active threads having local pointers that point to the function table, and deletes stored function tables that are not pointed at by the local pointers of any active threads.

In some examples according to the second aspect, the function tables are stored in the memory as a linked list of shared objects and may be stored in a cache region of the memory allocated to the application.

According to a third example aspect is a computer program product comprising a non-transient storage medium storing instructions to cause a processing device to: store, in memory allocated to a program, a first function table that points to executable code in the memory for functions from a first version of a software component; store, in the memory, a second function table that points to executable code in the memory for functions from a second version of the software component; reference the first function table, when running a first application thread, to execute the functions from the first version of the software component; and reference the second function table, when running a second application thread that is active concurrently with the first application thread, to execute the functions from the second version of the software component.

According to a fourth aspect is a method for supporting multiple update versions of a software component that is used by multiple threads of an application. The method includes storing, in memory allocated to the application, executable code for a first version of the software component; storing, in the memory, executable code for an update version of the software component; running, by a first thread of the application, the executable code for the first version of the software component; and running, by a second thread of the application that is active concurrently with the first thread, the executable code for the update version of the software component.

In some examples of the forth aspect, executable code for multiple versions of the software component are concurrently stored in the memory and each version has one or more associated callable functions, the method also including: storing, in the memory, a respective function table for each version, each function table including pointers to respective locations in the memory of the functions associated with the version; setting a global pointer value to point to the respective function table for the version that is the most recent of the versions; and setting, at different times for a plurality of threads of the application, a respective thread local pointer equal to the global pointer value; wherein running the executable code comprises calling one or more of the functions based on the function table that is pointed to by the thread local pointer of a calling thread.

According to a fifth aspect is a processing system configured to support a live software component update. The processing system includes a processing device, a memory associated with the processing device, and a non-transient storage for storing instructions. The instructions, when loaded to the memory and executed by the processing device, cause the processing system to: store, in a portion of the memory allocated to the application, executable code for a first version of the software component; store, in the memory, executable code for an update version of the software component; run, by a first thread of the application, the executable code for the first version of the software component; and run, by a second thread of the application that is active concurrently with the first thread, the executable code for the update version of the software component.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF ILLUSTRATIVE EMBODIMENTS

The present disclosure presents a dynamic software update (DSU) system for updating software components such as plugins used by multi-threaded applications. The DSU system is asynchronous in that the update can be done on a thread by thread basis during an application's runtime with each thread independently updating to a new plugin version at an opportune time for that particular thread. Accordingly, the application environment does not have to be quiesced before a dynamic update can be applied. Although the presently described asynchronous DSU system can be implemented in different environments, Standard C programming language and Go programming language syntax are used in this description to illustrate example embodiments. An example embodiment will first be described in the context of a C programming language environment.

Figure 1:
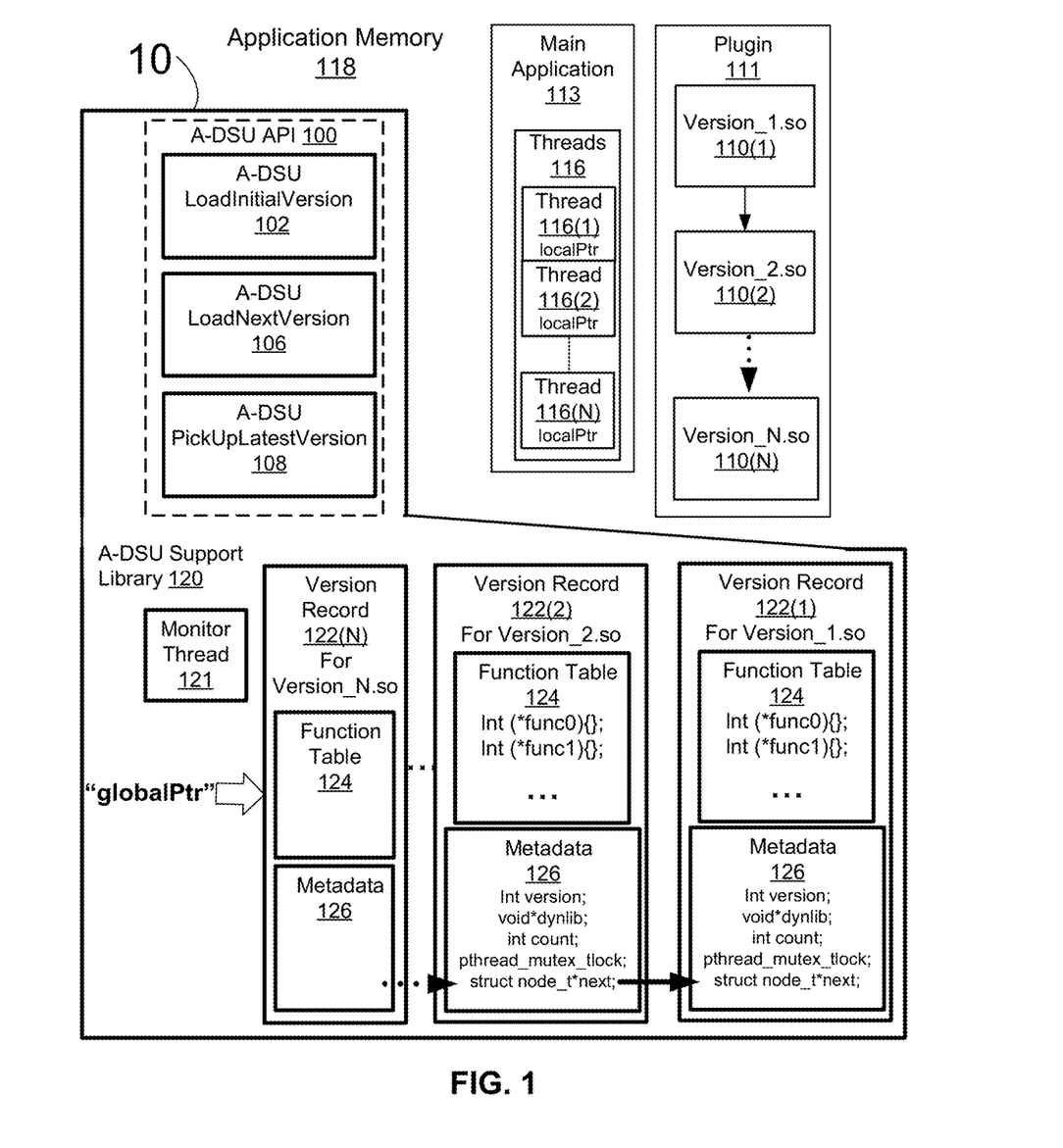
FIG. 1 is a schematic representation of elements of an asynchronous dynamic software update system according to example embodiments.

FIG. 1 schematically represents an architecture of an asynchronous DSU (A-DSU) system 10 according to example embodiments, along with a multi-threaded main application 113 and a software component such as a plugin 111 that is used by the main application 113. In particular, FIG. 1 schematically represents software and data components stored in RAM memory 118 assigned by an operating system to main application 113. Memory assigned by an operating system to the main application 113 is referred to below as application memory 118. In the illustrated embodiment, A-DSU system 10 is implemented through A-DSU Support Library 120 that exposes one or more application program interface (API) components A-DSU API 100. A-DSU Support Library 120 includes the code, data and bookkeeping elements required to support the DSU operations described in this disclosure. The software and data files required for A-DSU Support Library 120 may, for example, be provided to users as one or more library files. As will be explained in greater detail below, during system operation the components of A-DSU Support Library 120 are used to facilitate the updates of a software component such as plugin 111 that is used by main application 113. In example embodiments, A-DSU Support Library 120 is allocated memory within the application memory 118 as required to load the executable code and reference files required for A-DSU Support Library 120.

Add-on software components such a plugins are typically a collection of files and functions in a shared object dynamic library and are conventionally exposed as function pointers in a shared library. A common example of plugins that are commonly used by a main application include APIs (including, for example well documented APIs such as the storage engine APIs underneath Relational Database Services (RDS) such as MySQL, and the controller code APIs that run on base station units (BU) in a Cloud-Radio Access Network (Cloud-RAN)). In FIG. 1, multiple versions of plugin 111 are represented, including an initial or first version of plugin 111 (represented as Version_1.so 110(1)), an updated second version of plugin 111 (represented as Version_2.so 110(2)) and an Nth update version (represented as Version_N.so 110(N)). The plugin update versions become available during the runtime of main application 113. Plugin versions are generically referred to as Version.so.

During runtime, main application 113 can access shared library software components such as plugin 111 that are dynamically loaded (for example by using the "dlopen" command) into the application memory 118. When the plugin 111 is first loaded, an operating system allocates address space for the plugin within the application memory 118, and loads the plugin's initial version executable code (shown as Version_1.so 110(1) in FIG. 1) into the allocated address space of the main application's memory 118. The main application 113 will typically create multiple threads 116(1) to 116(N) (grouped together as threads 116 under "Main Application 113" in FIG. 1) that each share access to plugin 111's executable code Version_1.so 110(1).

In example embodiments, the main application 113 includes code elements to make the program compatible with A-DSU API 100 and other elements of the A-DSU Support Library 120. In one example, this is done by including calls to various A-DSU API functions 100 in the main application 113. As shown in FIG. 1, three A-DSU-API functions included as part of the A-DSU API 100 and exposed by A-DSU Support Library 120 are represented as: LoadInitialVersion 102; LoadNextVersion 106; and PickUpLatestVersion 108. As will be explained in greater detail below, the function LoadInitialVersion 102 is used to load an initial plugin code version into memory 118 and set up bookkeeping elements to support future plugin code version updates. The function LoadNextVersion 106 is used to load and support updated plugin versions. The function PickUpLatestVersion 108 is used to transition a running thread 116 to the updated executing plugin version.

In example embodiments, a call to A-DSU function LoadInitialVersion 102 is included in main application 113 to load the first plugin Version_1.so 110(1). In one example, the LoadInitialVersion 102 function call is included in main application 113 in place of a "dlopen" call, and takes the form LoadInitialVersion (lib string, flag int). The parameter "lib" specifies the location in persistent storage (for example a system hard drive) of the code for plugin Version_1.so 110(1). The parameter "flag" identifies types of plugin update monitoring. In one example, the flag parameter be set to the following values: flag="0", which indicates no update monitoring is required because updates will be manually triggered by main application 113 calling the A_DSU function LoadNextVersion directly; flag="SIG" which indicates that updates will be triggered by an interrupt signal such as SIGUSR1 or SIGUSR2, and flag="FS", which indicates that an update will be triggered by notification of a change to a specified file (for example, via inotify).

As noted above, when called by the main application 113, A-DSU function LoadInitialVersion 102 loads initial plugin code Version_1.so 110(1) into memory 118 allocated by the operating system to main application 113. As part of the loading process, the LoadInitialVersion 102 function sets up bookkeeping elements to support future plugin code version updates. In this regard, in one example embodiment A-DSU function LoadInitialVersion 102 executes the following actions: (1) dynamically loads Version_1.so 110(1) into application memory 118; (2) causes a version record, represented in FIG. 1 as version record 122(1) for Version_1.so 110(1), to be created in A-DSU Support Library 120 in application memory 118; and (3) initiates a monitoring thread. Reference number 122 is used herein to generically refer to one or more version records 122(1) to 122(N). In an example embodiment version records 122 are each implemented as a C-style struct.

The purpose of the version record 122(1) is to provide a function table that identifies all the functions exposed by plugin Version_1.so 110(1) and provides pointers to the functions in application memory 118. In this regard, the version record 122(1) includes a function table 124, which as shown in FIG. 1 identifies and points to a plurality of functions (func0, func1, . . . ). LoadInitialVersion 102 also sets a global pointer variable "globalPtr" in A-DSU Support Library 120 that points to the newly created version record 122(1), and initializes a set of metadata 126 associated with the plugin Version_1.so 110(1). In the illustrated example, metadata 126 includes: "version"—a variable that identifies the version of the plugin 111 that is represented by the version record 122(1); "*dynlib"—points to the shared library for version 1.so as it resides in memory 118; "count"—a thread reference count variable that identifies the number of program threads 116, 116 that are currently using Version_1.so 110(1); "pthread_mutex-tlock"—a lock used by threads to facilitate updating of the variable "count"; and "struct node_t*next"—which points to the previous version record 122(i). In the illustrated example of A-DSU Support Library 120 the A-DSU version records 122 are implemented as a linked list. In some examples, different hardware specific locking mechanisms may be used in place of pthread_mutex_tlock and unlock.

With respect to monitoring thread creation, the function LoadInitialVersion 102 also performs any initializations required to support the type of program update monitoring identified by the "flag" variable in the call to LoadInitialVersion 102. For example, in the case of flag="SIG", LoadInitialVersion 102 will install a signal handler to monitor for a signal such as SIGUSR1 or SIGUSR2 (referred to herein as SIGUSR) to trigger a program update. In some example implementations, a monitor thread 121 is created within the A-DSU Support Library 120 to monitor for a SIGUSR signal, and perform garbage collection as described below.

Figure 2:
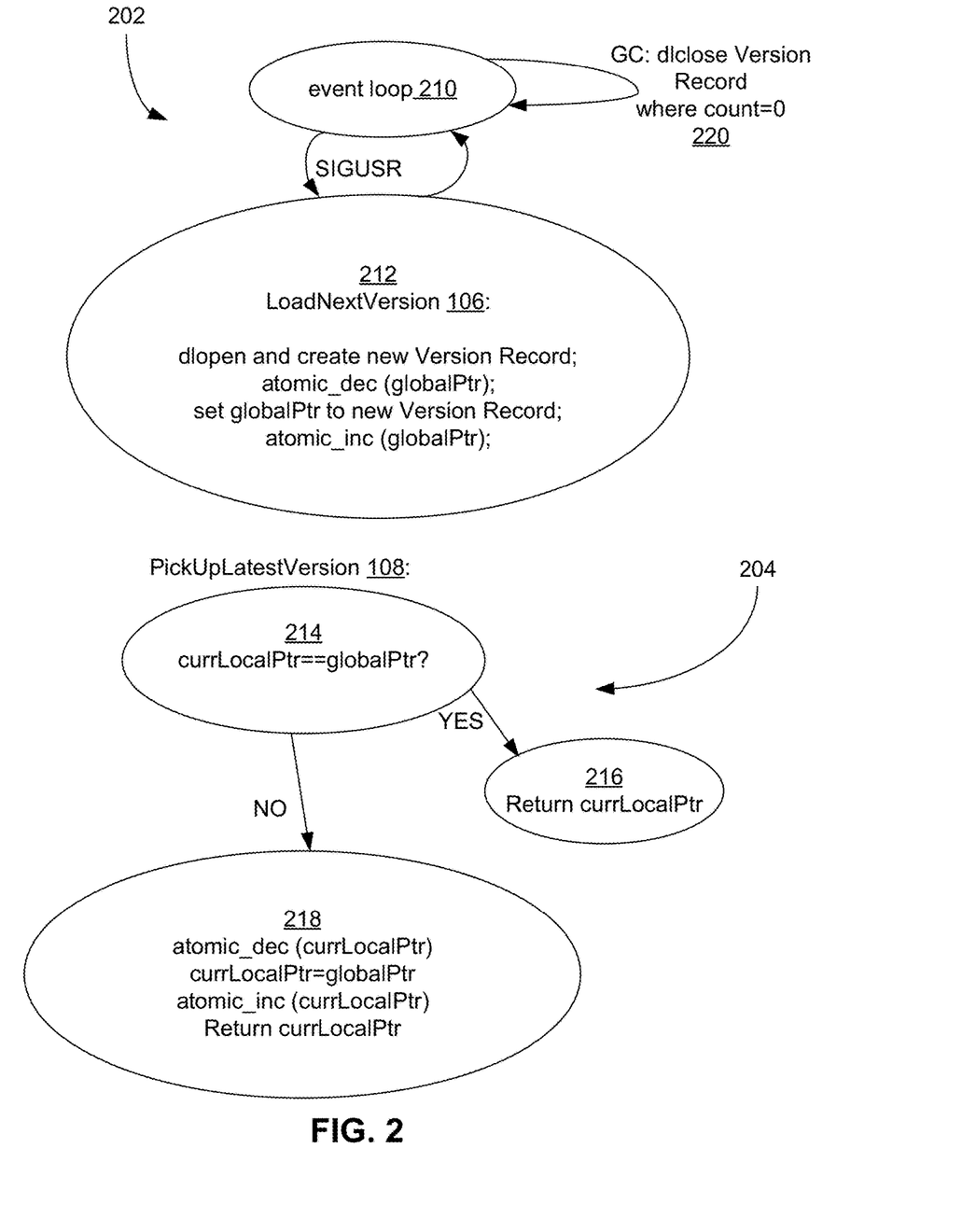
FIG. 2 shows state diagrams representing a C-language implementation of the asynchronous dynamic software update system of FIG. 1.

While Version_1.so 110(1) is running, threads 116 may be created by main application 113. In example embodiments, each time a new thread 116 is created it is assigned a "localPtr" in its thread local storage (TLS) in application memory 118 that is used to point to the current version record 122. In the case of a newly loaded program, the "localPTR" for the initial thread 116(1) will initially be null. When the initial thread 116(1) is created a call is made to A-DSU PickUpLatestVersion function 108 in the form of: PickUpLatestVersion (LocalPtr). The calling thread 116(1) passes its null "localPtr" value as an input parameter to the PickUpLatestVersion function 108, which is configured to return a pointer to the most recently created version record 122 and also perform bookkeeping functions by updating the metadata 126 of the current and previous version records 122. In this regard, reference 204 in FIG. 2 shows a state diagram representation of the A-DSU PickUpLatestVersion function 108. As shown in state 214, the PickUpLatestVersion function 108 compares the "currLocalPtr" value it receives from the calling thread 116 (for example thread 116(1)) against the "globalPtr". In the case thread 116(1), the "curLocalPtr" value is null and thus will not be equal to the value of the globalPtr. This results in the PickUpLatestVersion function 108 performing actions indicated in state 218. These actions include setting "currLocalPtr" equal to "globalPtr" (currLocalPtr=globalPtr), increasing the version "count" in metadata 124 by one to track the total number of threads that are using the current plugin Version_1.so 110(1) (atomic_inc (currLocalPtr)), and returning the currLocalPtr value to the calling thread 116 to use as its "localPtr" value.

When calling a function, each thread 116(1) to 116(N) references the function table 124 of the version record 122 that the thread's "localPtr" points to. Accordingly, it the case of a newly loaded initial plugin Version_1.so 110(1) for which no updates have occurred, the "globalPtr" value and the localPtr values for the respective threads 116(1) to 116(N) will all point to the version record 122(1) for Version_1.so 110(1), which in turn identifies all the functions that are included in Version_1.so 110(1) and the locations of the executable code for such functions in the main application memory 118.

The system 10 supports live updates for multiple update versions of plugin 111, enabling updates from Version_1.so 110(1) to Version_2.so 110(2) and so on to version.so 110(N) as such updates become available. The operation of system 10 to implement a live update from plugin 111 Version_1.so 110(1) to Version_2.so 110(2) will now be described with reference to FIGS. 1 and 2. The presently described example concerns a scenario in which the changes require one or more selected plugin functions (func0, func1, etc.) to be updated that do not read or write to global variables.

In this regard, a plugin update is initiated (by a system operator, for example) when Version_2.so 110(2) of plugin 111 becomes available. In some examples, Version_2.so 110(2) includes updates of one or more of the plugin functions func0, func1, and may include additional functions.

In an example embodiment, a system operator triggers the update signal SIGUSR when the updated plugin Version_2.so 110(2) is available for dynamic loading. As noted above, in one embodiment a monitor thread 121 of the A-DSU support library 120 is configured to monitor for the SIGUSR signal, and in this regard, FIG. 2 includes a state diagram 202 that represents actions taken by the monitoring thread 121. As indicated in state diagram 202, the monitor thread 121 remains in an event loop state 210 until the SIGUSR signal is detected, at which time the A-DSU function LoadNextVersion 106 is called as indicated by state 212. The LoadNextVersion function 106 performs the actions shown in state 212. As indicated by the statement "dlopen and create new Version Record", Version_2.so 110(2) is dynamically loaded into application memory 118 and a corresponding version record 122(2) struct for Version_2.so 110(2) is created in the A-DSU Support Library 120. At such time, multiple versions of plugin 111 are present in the application memory 118 (Version_1.so 110(1) and Version_2.so 110(2)) and multiple corresponding version records (version record 122(1) and 122(2)) are present in A-DSU Support Library 120. The new version record 122(2) also includes a function table 124 that identifies and points to the functions of Version_2.so 110(2).

A-DSU function LoadNextVersion 106 also updates the "globalPtr" to point to the newly created version record 122(2) in A-DSU Support Library 120, as indicated by statement "set globalPtr to new Version Record" in state 212. As indicated by the statement "atomic-dec old Version Record's reference count" in state 212, the pthread_mutex_tlock of old version record 122(1) is locked for the time when the variable "count" in the old version record 122(1) metadata 126 is decreased by 1. Correspondingly, as indicated by the statement "atomic-inc new Version Record's reference count" in state 212, the pthread_mutex_tlock of new version record 122(2) is locked for the time when the variable "count" in the new version record 122(2) metadata 126 is increased to 1. Other metadata 126 variables in version record 122(2) are populated as follows: "version"—is set as Version_2.so 110(2); "*dynlib"—points to a shared library in which the functions func0, func1, etc. are located in application memory 118; and "struct node_t*next" is set to point to the last version record in A-DSU Support Library 120 that preceded the newly loaded version record 122(2) and that is still active, which in the present example is version record 122(1) in A-DSU Support Library 120. Accordingly, in example embodiments, A-DSU Support Library 120 includes a linked list of version record objects that each contain a respective function table 124. Each version record object includes a link to the version record object that most recently preceded it and is still active (i.e. still has a "count" greater than zero). As indicated above, version records 122(1), 122(2) can be implemented as C-style struct objects in example embodiments.

The "LoadNextVersion" function 106 (including the steps shown in state 212) will be performed each time an update occurs for plugin 111. As noted above, although a SIGUSR signal was used to signal the availability of Version_2.so 110(2), in example embodiments the "LoadNextVersion" function 106 can be triggered by alternative mechanisms, including for example a manual trigger in which an explicit call to "LoadNextVersion" function 106 is included in the code of main application 113.

It will be appreciated that upon completion of the "LoadNextVersion" function 106, the variable "globalPtr" that is used by system 10 to point to the current version record 122 will point to the most recent version record (for example version record 122(2)), whereas the threads 116 will still be working with a prior version record (for example version record 122(1)) as indicated by their respective "localPtr" variables. Each thread 116 will continue to independently execute its corresponding codeuntil it encounters a "PickUpLatestVersion" function call in the code. In this regard, when a programmer is configuring the main application 113 to make the program A-DSU compatible, the programmer will select opportune locations to insert "PickUpLatestVersion" function calls in the program code. In particular, an opportune location for such a calls will ideally be at a point in the code when a transition to an updated plugin 111 Version.so can be performed seamlessly from the perspective of the thread 116.

Referring again to the state diagram 204 in FIG. 2, a call to the A-DSU function "PickUpLatestVersion" 108 by a thread 116 copies the thread's "localPtr" value to the variable "currLocalPtr" of function 108, which is then compared (state 214) to the "globalPtr" value. If the values are equal, the thread 116 is using the current version record 122 and corresponding current plugin Version.so and no update is required at the thread level. In such case, "PickUpLatestVersion" function 108 simply returns the value of currLocalPtr to the calling thread 116, as indicated in state 216. However, if the "globalPtr" and the "currLocalPtr" values don't match, then a thread level plugin version update is required and the actions shown in state 218 are performed. In the example of a thread level update from Version_1.so 110(1) to Version_2.so 110(2), the following occurs: (1) As indicated by the statement "atomic_dec (currLocalPtr), the pthread_mutex_tlock of previous version record 122(1) is momentarily locked and the variable "int count" in the previous version record 122(1) metadata 126 is decreased by 1; (2) As indicated by the statement "currlocalPtr=globalPtr" the currlocalPtr value is updated to equal the globalPtr, which points to the current version record 122(2) for updated plugin Version_2.so 110(2); (3) As indicated by the statement "atomic_inc (currLocalPtr), the, the pthread_mutex_tlock of the new version record 122(2) is momentarily locked and the variable "int count" in the new version record 122(2) metadata 126 is increased by 1; and (4) the new value of "currLocalPtr" is returned to the calling thread 116 as the new "localPtr" value for the thread.

Accordingly, at the completion of the A-DSU function "PickUpLatestVersion" 108, the calling thread 116 is updated to the new plugin Version_2.so 110(2). Each of the threads 116 will respectively call the A-DSU function "PickUpLatestVersion" 108 at the time that is appropriate for that thread, so a synchronous quiescing of all threads is not required. Rather, individual threads 116 asynchronously update to the new Version_2.so 110(2).

Although the above description specifically referenced an update from Version_1.so 110(1) to Version_2.so 110(2), the same procedure is performed to update to subsequent version updates. At any given time, it is possible that the executable code and corresponding version records 122 for multiple plugin version updates will be active in application memory 118, with different update versions being used concurrently by different threads 116.

Referring to state diagram 202 in FIG. 2, in example embodiments the monitor thread 121 is configured to periodically traverse the linked list of version records 122 that are included in A-DSU Support Library 120 to look for versions records 122 where "count"=0 and perform a garbage collection (GC) operation 220 on such objects. For example, in the situation where all threads 116 have updated from Version_1.so 110(1) to Version_2.so 110(2), the variable "count" in metadata 126 of version record 122(1) will have a value of "zero". Accordingly, GC operation 220 will close (for example using the dlclose operation in C) Version_1.so 110(1) to release memory. GC operation 220 can also release portions of memory that store the version record 122(1). As noted above, the "struct node_t*next" variable in metadata 126 is used to point to the next version record in A-DSU Support Library 120 that preceded the current version record and that is still active. Accordingly, in the example of a completed update from Version_1.so 110(1) to Version_2.so 110(2), the variable "struct node_t*next" in metadata 126 for version record 122(2) would be set to null once the version record 122(1) has a int count of 0. In at least some examples where a plurality of program updates have occurred, it is possible that a prior version of executable code and corresponding version record from an update prior to the previous update version could still be active even when one or more intervening version records have been closed. For example, version record 122(1) could still be used by some threads, even when version record 122(2) no longer exists, in which case the "struct node_t*next" variable in metadata 126 for the current version record (for example version record 122(N)) will be set to point to the next still active preceding version record 122(1).

It will thus be appreciated that the update system 10 provides an environment in which multiple threads 116 can be asynchronously migrated to updated executable plugin code without requiring the main application to be quiesced or stopped. Each thread 116 is able to migrate at an update point in code execution that has been selected as most convenient for that particular thread. Such an A-DSU system can be particularly useful for system configuration changes including database administrative changes. Also, such an A-DSU system can be useful to support long-term connections during a webserver update. In the webserver use case, there can often be hundreds of threads concurrently running to handle user requests, and the presently described A-DSU system can facilitate the update without requiring a system wide quiescing and the resources required to support such a quiescing.

Although described above in the context of a C-language programming environment, A-DSU-system 10 can also be implemented in other environments, including for example the Go programming language. In some example embodiments, the Go implementation is similar to that described above in respect of C, subject to the two following differences. Given the relative ease with which lightweight worker threads (known as Goroutines) are spawned in Go, in some example embodiments each Goroutine thread uses the same plugin version.so throughout its existence from the time it is spawned until the time that it finishes running, even if an executable code update occurs during the duration of the Goroutine. Accordingly, unlike the C implementation, in some example embodiments individual Goroutine threads will not migrate from one plugin version to another while running. Furthermore, because Go runtime manages garbage collection, the A-DSU specific coding required to implement garbage collection (GC) in the Go environment is reduced compared to that required for a C implementation. In some example embodiments, DSU-system 10 can alternatively be configured to support active migration of a Goroutine thread from one plugin version to another in a similar manner to that described above in respect of C-implementation.

Figure 3:
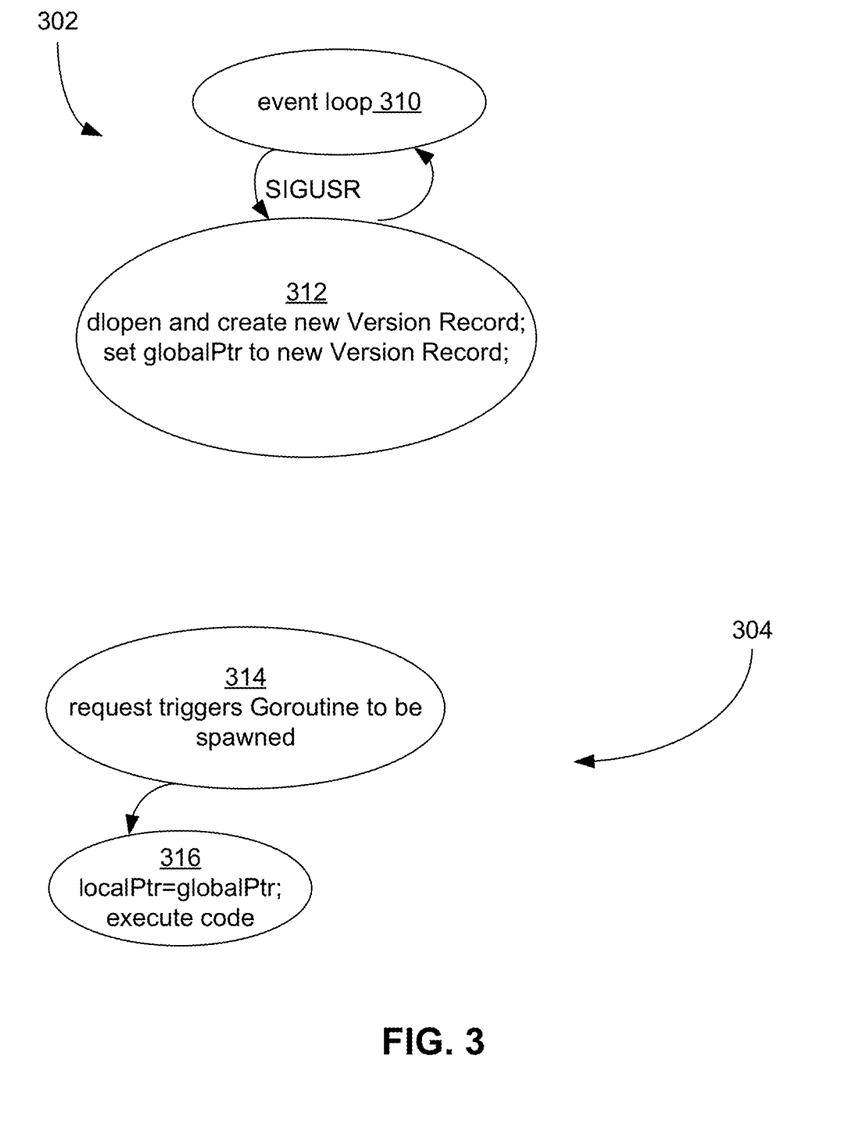
FIG. 3 shows state diagrams representing a Go-language implementation of the asynchronous dynamic software update system of FIG. 1.

In this regard, FIG. 3 provides two state diagrams 302, 304 that correspond to a Go implemented embodiment of A-DSU system 10. Referring to FIGS. 1 and 3, similar to the C-implemented embodiment, in the illustrated Go embodiment, calling the API function A-DSU LoadInitialVersion 102 causes initial plugin Version_1.so 110(1) to be loaded into application memory 118 and the creation of new version record 122(1) for Version_1.so 110(1) in A-DSU Support Library 120. The "globalPtr" value is set to point to the newly created version record 122(1). In the Go environment, much of the metadata 126 is maintained by Go runtime, including the thread "count" value, and a garbage collection finalizer is associated with each newly created version record object. Each version record object is automatically deallocated by its associated garbage collection finalizer when it is no longer referenced by any threads.

Referring to state diagram 302, the function A-DSU LoadInitialVersion 102 also starts a Goroutine monitor thread 116 that operates in an event loop state 310 and monitors for signal SIGUSR that indicates when an updated version is available for loading into application memory 118. When the SIGUSR signal is detected, a call to the A-DSU LoadNextVersion function occurs, as indicated in state 312, resulting in the loading of the new plugin version (for example, Version_2.so 110(2)) (as indicted by the statement "dlopen") and creation of a new version record (for example version record 122(2)) that includes function pointers for the newly loaded version. The "globalPtr" value is updated to point at the newly opened version record 122(2). Go runtime automatically takes care of garbage collection for old version records whose "count" value goes to zero. In particular, when the number of threads using a version.so goes to zero, garbage collection is triggered and the associated Go finalizer is invoked. As a result, Version_1.so is closed leading to appropriate cleanup including removal of Version_1.so from the application memory 118.

Referring to state diagram 304, each new Goroutine thread 116 that is started (state 314) has the current "globalPtr" value copied to its associated "localPtr" (state 316). The Goroutine thread 116 will use that localPtr value (and hence the corresponding version record and functions) throughout the entire time that the Goroutine thread 116 is running. Thus, depending on the "globalPtr" value over time, different Goroutine threads 116 that start at different times but which run concurrently can point to different version records 122 and thus use different plugin versions versioni.so 110(i), however each Goroutine thread 116 will continue throughout its existence to use the same plugin version that it was initially assigned. As suggested above, an assumption is made that each Goroutine thread 116 will have a relatively short running time such that the use of single version for that running time will typically not be problematic. Once a Goroutine thread 116 finishes, its localPtr goes out of scope, releasing the thread's reference to the corresponding version record shared object 122. Go runtime tracks and updates the thread "count" for each version record as new Goroutine threads reference the version record and running Goroutines expire.

Figure 4:
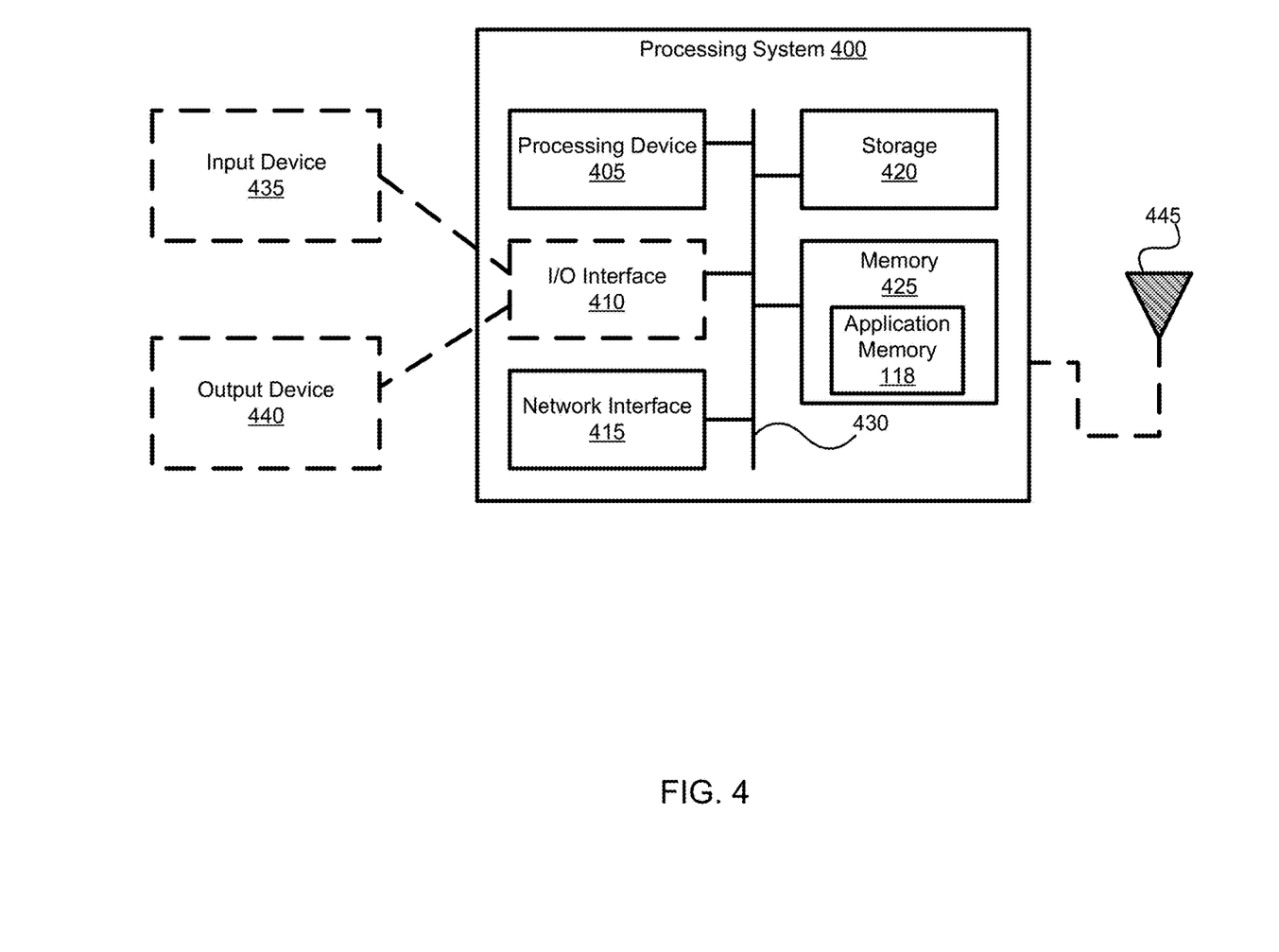
FIG. 4 is a schematic representation of a processing system used to implement the asynchronous dynamic software update system of FIG. 1.

FIG. 4 is a schematic diagram of an example processing system 400, which may be used to implement the methods and systems disclosed herein. The processing system 400 may be a server or base station, for example, or any suitable computing system. Other processing systems suitable for implementing examples described in the present disclosure may be used, which may include components different from those discussed below. Although FIG. 4 shows a single instance of each component, there may be multiple instances of each component in the processing system 400 and the processing system 400 could be implemented using parallel and/or distributed systems.

The processing system 400 may include one or more processing devices 405, such as a processor, a microprocessor, an application-specific integrated circuit (ASIC), a field-programmable gate array (FPGA), a dedicated logic circuitry, or combinations thereof. The processing system 400 may also include one or more optional input/output (I/O) interfaces 410, which may enable interfacing with one or more appropriate input devices 435 and/or output devices 440. The processing system 400 may include one or more network interfaces 415 for wired or wireless communication with a network (e.g., an intranet, the Internet, a P2P network, a WAN and/or a LAN) or other node. The network interfaces 415 may include one or more interfaces to wired networks and wireless networks. Wired networks may make use of wired links (e.g., Ethernet cable). Wireless networks, where they are used, may make use of wireless connections transmitted over antenna 445. The network interfaces 415 may provide wireless communication via one or more transmitters or transmit antennas and one or more receivers or receive antennas, for example. In this example, a single antenna 445 is shown, which may serve as both transmitter and receiver. However, in other examples there may be separate antennas for transmitting and receiving. In embodiments in which the processing system is a network controller, such as an SDN Controller, there may be no wireless interface, and antenna 445 may not be present in all embodiments. The processing system 400 may also include one or more storage units 420, which may include a mass storage unit such as a solid state drive, a hard disk drive, a magnetic disk drive and/or an optical disk drive.

The processing system 400 may include one or more memories 425, which may include a volatile or non-volatile memory (e.g., a flash memory, a random access memory (RAM), and/or a read-only memory (ROM)). The non-transitory memories 425 (as well as storage 420) may store instructions for execution by the processing devices 405, such as to carry out methods such as those described in the present disclosure. The memories 425 may include other software instructions, such as for implementing an operating system and other applications/functions. In some examples, one or more data sets and/or modules may be provided by an external memory (e.g., an external drive in wired or wireless communication with the processing system 400) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 430 providing communication among components of the processing system 400. The bus 430 may be any suitable bus architecture including, for example, a memory bus, a peripheral bus or a video bus. Optional input devices 435 (e.g., a keyboard, a mouse, a microphone, a touchscreen, and/or a keypad) and output devices 440 (e.g., a display, a speaker and/or a printer) are shown as external to the processing system 400, and connected to optional I/O interface 410. In other examples, one or more of the input devices 435 and/or the output devices 440 may be included as a component of the processing system 400. Embodiments in which processing system 400 is a network controller may lack a physical I/O interface 410, and instead may be a so-called headless server for which all interactions are carried out through a connection to network interface 415.

In example embodiments, a processing system 400 configured to implement A-DSU system 10 may be configured to maintain information or files that include the object code for A-DSU API 100 in memory 425 or storage 420 or a combination thereof. In example embodiments, application memory 118 allocated by an operating system for A-DSU Support Library 120, main application 113 and plugin 111 is part of memory 425. In some implementations, the memory 425 that is used for A-DSU Support Library 120, including version records 122, is the L1 cache assigned to by operating system software to processing device 405 to support the main application 113.

Thus, in an example embodiment, processing system 400 is configured to support multiple running threads 116 of an application through live plugin updates. Non-transient storage 420 stores instructions that when loaded to the memory 425 and executed by the processing device 405 cause the processing system to: store, for each executable code update version_i.so 110(*i*) of a software component (such as a plugin) loaded into the application memory 118, an associated function table 124 that points to the updated versioni.so 110(*i*) code in the memory; set a global pointer (globalPtr) to point to the function table 124 associated with the most recently loaded versioni.so 110(*i*); set, when an application thread 116 is created, a local pointer (localPtr) of the application thread 116 equal to the global pointer (globalPtr); and use, for each application thread 116, the versioni.so 110(*i*) associated with the function table 124 pointed to by the application thread's local pointer (localPtr).

Figure 5:
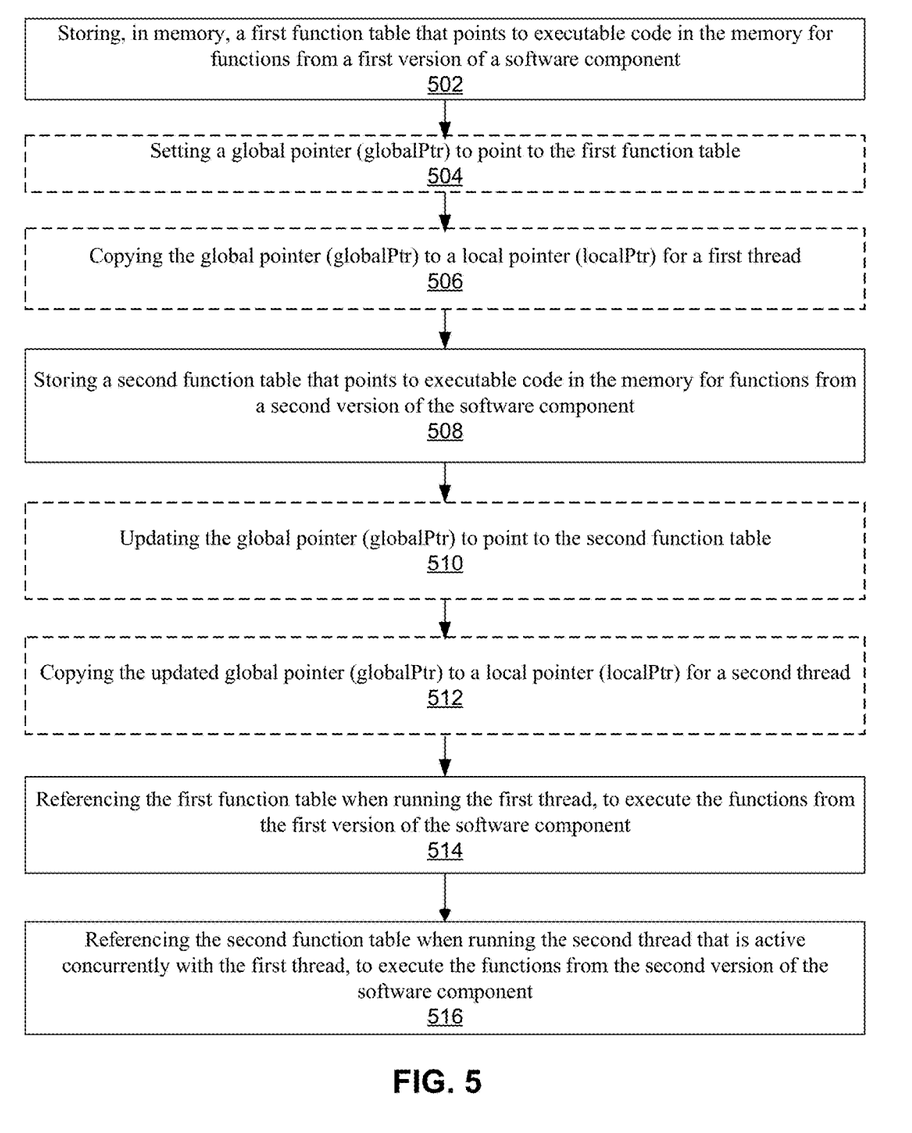
FIG. 5 is a flow diagram illustrating a method of supporting a software update according to example embodiments.

FIG. 5 shows method steps that correspond to an example embodiment. The steps shown in dashed lines correspond to one non-limiting option for supporting the steps shown in in solid lines. In the example of FIG. 5, a first function table 124 (included in first version record 122(1)) is stored that points to executable code in the memory 425 for functions (func0, func1 . . . ) from a first version (Version_1.so 110(1)) of a software component (Action 502). A global pointer (globalPtr) is set to point to the first function table 124 (Action 504) and the global pointer (globalPtr) is copied to a local pointer (localPtr) for a first application thread 116(1) (Action 506). A second function table 124 (included in version record 122(2)) is then stored that points to executable code in the memory 425 for functions from a second version (Version_2.so 110(2)) of the program (Action 508). The global pointer (globalPtr) is updated to point to the second function table 124 (Action 510) and updated global pointer (globalPtr) is copied to a local pointer (localPtr) for a second application thread 116(2) (Action 512). At such time, the localPtr for the first application thread 116(1) still points to the first function table 124 in version record 122(1), so the first function table is referenced when running the first application thread 116(1), to execute the functions from the first version of the software component (Action 514). However co-existing second application thread 116(2) has a localPtr that points to the second function table 124 in version record 122(2), so the second function table is referenced when running the second application thread 116(2), to execute the functions from the second version of the software component (Action 516).

Figure 6:
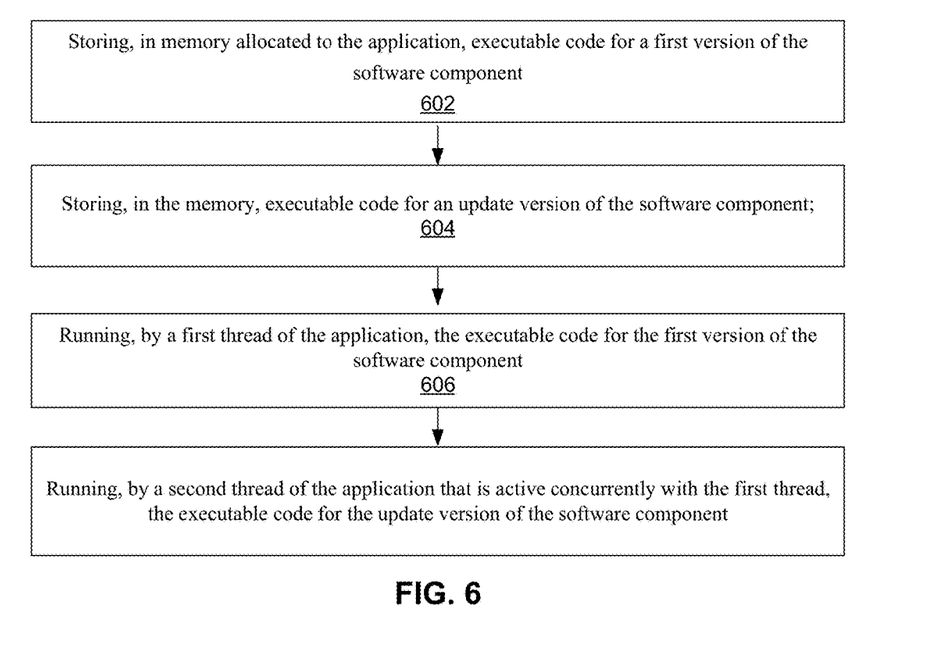
FIG. 6 is a flow diagram illustrating a method of performing a software update according to example embodiments.

FIG. 6 shows, according to a further example embodiment, method steps for supporting multiple update versions of a software component (such as a plugin 111) is used by multiple threads 116 of an application 113. The method includes: storing, in memory 118 allocated to the application 113, executable code for a first version (for example Version_1.so 110(1)) of the software component 111 (Action 602); storing, in the memory 118, executable code for an update version (for example, Version_2.so 110(2)) of the software component (Action 604); running, by a first thread (for example thread 116(1)) of the application 113, the executable code for the first version of the software component (Action 606); and running, by a second thread (for example thread 116(2)) of the application 113 that is active concurrently with the first thread, the executable code for the update version of the software component 111 (Action 608).

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

Certain adaptations and modifications of the described embodiments can be made. Therefore, the above discussed embodiments are considered to be illustrative and not restrictive. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for updating a software component used by a multi-threaded application, comprising:
    storing, in memory, a first function table that points to executable code in the memory for functions from a first version of the software component;
    setting a global pointer to point to the first function table;
    copying the global pointer to a local pointer of a first application thread of the multi-threaded application;
    storing, in the memory, a second function table that points to executable code in the memory for functions from a second version of the software component;
    referencing the first function table that the local pointer of the first application thread points to, when running the first application thread, to execute the functions from the first version of the software component;
    responsive to receiving a signal indicating that the second version of the software component is available, updating the global pointer to point to the second function table;
    copying the global pointer to a local pointer of a second application thread of the multi-thread application; and
    referencing the second function table that the local pointer of the second application thread points to, when running the second application thread that is active concurrently with the first application thread, to execute the functions from the second version of the software component.

2. The method of claim 1 wherein the first function table and the second function table are stored as objects in a linked list.

3. The method of claim 1 comprising copying the global pointer to the local pointer of the first application thread to update the first application thread to the functions from the second version of the software component.

4. The method of claim 3 comprising de-allocating memory for the first version of the software component when no application threads have a local pointer that references the first function table.

5. The method of claim 1 comprising including a pointer in the second function table that points to the first function table.

6. The method of claim 1 wherein the application is a Go program and the running threads are goroutines.

7. A processing system configured to update a live software component used by a multi-threaded application, comprising:
a processing device;
a memory associated with the processing device;
a non-transient storage for storing instructions that when loaded to the memory and executed by the processing device cause the processing system to:
store, in the memory, a first function table that points to executable code in the memory for functions from a first version of a software component;
set a global pointer to point to the first function table;
copy the global pointer to a local pointer of a first application thread of the multi-threaded application;
store, in the memory, a second function table that points to executable code in the memory for functions from a second version of the software component;
reference the first function table that the local pointer of the first application thread points to, when running the first thread of an application, to execute the functions from the first version of the software component;
responsive to receiving a signal indicating that the second version of the software component is available, update the global pointer to point to the second function table;
copy the global pointer to a local pointer of a second application thread of the multi-thread application; and
reference the second function table that the local pointer of the second application thread points to, when running the second thread of the application that is active concurrently with the first thread, to execute the functions from the second version of the software component.

8. The system of claim 7 wherein the instructions:
cause the processing system to copy the global pointer to the local pointer of the first application thread, by:
setting, when the first thread is created, the local pointer of the first thread equal to the global pointer; and
cause the processing system to copy the global pointer to the local pointer of the second application thread, by:
setting, when the second thread is created, the local pointer of the second thread equal to the global pointer.

9. The system of claim 8 wherein the instructions cause the processing system to:
for each of the threads of the application, asynchronously set the local pointer of the thread to a current value of the global pointer if the local pointer is not equal to the current value of the global pointer.

10. The system of claim 9 wherein the instructions cause the processing system to:
maintain a counter for each of the stored function tables that identifies a number of active threads having local pointers that point to the function table; and
delete stored function tables that are not pointed at by the local pointers of any active threads.

11. The system of claim 7 wherein the function tables are stored in the memory as a linked list of shared objects.

12. The system of claim 11 where in the function tables are stored in a cache region of the memory allocated to the application.

13. The system of claim 7 wherein the application is a Go program and the threads are goroutines.

14. A computer program product comprising a non-transient storage medium storing instructions to cause a processing device to:
store, in memory allocated to a program, a first function table that points to executable code in the memory for functions from a first version of a software component;
set a global pointer to point to the first function table;
copy the global pointer to a local pointer of a first application thread of the multi-threaded application;
store, in the memory, a second function table that points to executable code in the memory for functions from a second version of the software component;
reference the first function table that the local pointer of the first application thread points to, when running the first application thread, to execute the functions from the first version of the software component;
responsive to receiving a signal indicating that the second version of the software component is available, update the global pointer to point to the second function table in accordance with the received signal;
copy the global pointer to a local pointer of a second application thread; and
reference the second function table that the local pointer of the second application thread points to, when running the second application thread that is active concurrently with the first application thread, to execute the functions from the second version of the software component.

15. The computer program product of claim 14 wherein the first function table and the second function table are stored as shared objects in a linked list.

* * * * *